US011023111B2

(12) United States Patent
Derner et al.

(10) Patent No.: US 11,023,111 B2
(45) Date of Patent: Jun. 1, 2021

(54) SYSTEM, APPARATUS, AND RELATED METHOD FOR GENERATING A GEOSPATIAL INTERACTIVE COMPOSITE WEB-BASED IMAGE MAP

(71) Applicant: Micron Technology, Inc., Boise, ID (US)

(72) Inventors: Scott J. Derner, Boise, ID (US); Patrick Mullarkey, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 345 days.

(21) Appl. No.: 15/966,483

(22) Filed: Apr. 30, 2018

(65) Prior Publication Data

US 2019/0163349 A1    May 30, 2019

Related U.S. Application Data

(60) Provisional application No. 62/591,352, filed on Nov. 28, 2017.

(51) Int. Cl.
| | | |
|---|---|---|
| *G06F 3/0484* | (2013.01) | |
| *G06F 3/00* | (2006.01) | |
| *G06F 16/29* | (2019.01) | |
| *G06F 16/70* | (2019.01) | |
| *G06F 16/54* | (2019.01) | |

(Continued)

(52) U.S. Cl.
CPC .......... *G06F 3/04842* (2013.01); *G06F 3/005* (2013.01); *G06F 3/04845* (2013.01); *G06F 16/29* (2019.01); *G06F 16/54* (2019.01); *G06F 16/70* (2019.01); *G06F 16/743* (2019.01); *G06F 16/904* (2019.01)

(58) Field of Classification Search
CPC .. G06F 3/04842; G06F 16/743; G06F 16/904; G06F 16/54; G06F 16/70; G06F 16/29; G06F 3/005; G06F 3/04845; G06F 2203/04806; G06F 3/04883; G06F 3/0485
USPC ......................................................... 701/532
See application file for complete search history.

(56) References Cited

U.S. PATENT DOCUMENTS

| | | | |
|---|---|---|---|
| 6,985,929 B1 * | 1/2006 | Wilson | ................ G06F 16/9537 709/217 |
| 8,468,464 B2 * | 6/2013 | Abramson | ............ G06T 3/0018 715/804 |

(Continued)

FOREIGN PATENT DOCUMENTS

| | | |
|---|---|---|
| EP | 1872294 B1 | 11/2017 |
| WO | 2015168001 A1 | 11/2015 |

*Primary Examiner* — Jonathan M Dager
*Assistant Examiner* — Jean W Charleston
(74) *Attorney, Agent, or Firm* — TraskBritt

(57) ABSTRACT

A system, apparatuses such as a non-transitory readable medium, and a method for generating a geospatial interactive composite web-based image map are disclosed. The system may be configured to receive, from a user device, a request for creating a geospatial interactive composite web-based image map for a selected region of map data displayed by the user device, select images responsive to the request corresponding to defined sub-regions within the selected region of the map data displayed by the user device, construct a collage for the geospatial composite web-based image map responsive to selecting the images, and transmit the collage to the user device for display thereon as an overlay to the map data.

20 Claims, 9 Drawing Sheets

(51) Int. Cl.
  *G06F 16/904* (2019.01)
  *G06F 16/74* (2019.01)

(56) References Cited

U.S. PATENT DOCUMENTS

| | | | |
|---|---|---|---|
| 8,957,955 B2* | 2/2015 | Reiner | G06F 19/321 |
| | | | 348/77 |
| 8,970,632 B2* | 3/2015 | Zhu | G06F 3/013 |
| | | | 345/660 |
| 8,984,445 B1* | 3/2015 | Bailiang | G06F 3/04817 |
| | | | 715/846 |
| 9,104,698 B2 | 8/2015 | Tysowski | |
| 9,195,290 B2 | 11/2015 | Siliski et al. | |
| 9,383,206 B2 | 7/2016 | Kimchi et al. | |
| 9,612,126 B2 | 4/2017 | Beletski et al. | |
| 9,766,089 B2 | 9/2017 | Kankainen | |
| 10,051,103 B1* | 8/2018 | Gordon | G06F 21/36 |
| 10,127,433 B2* | 11/2018 | Ascierto | G06T 7/11 |
| 2006/0238383 A1 | 10/2006 | Kimchi et al. | |
| 2009/0210388 A1* | 8/2009 | Elson | G06F 16/29 |
| 2011/0191023 A1* | 8/2011 | Engstrom | G01S 19/19 |
| | | | 701/532 |
| 2011/0276423 A1* | 11/2011 | Davidson | G06Q 30/0601 |
| | | | 705/26.1 |
| 2013/0073400 A1* | 3/2013 | Heath | G06F 16/29 |
| | | | 705/14.73 |
| 2013/0159330 A1* | 6/2013 | Smith | G06Q 50/01 |
| | | | 707/758 |
| 2013/0325341 A1* | 12/2013 | van Os | G06F 3/041 |
| | | | 701/533 |
| 2013/0325343 A1* | 12/2013 | Blumenberg | G01C 21/32 |
| | | | 701/533 |
| 2014/0052664 A1* | 2/2014 | Toffa | A63F 13/525 |
| | | | 705/347 |
| 2014/0143004 A1* | 5/2014 | Abhyanker | G06Q 30/02 |
| | | | 705/7.19 |
| 2014/0152869 A1* | 6/2014 | Solotko | H04N 5/23206 |
| | | | 348/231.3 |
| 2016/0182850 A1* | 6/2016 | Thompson | H04N 1/00106 |
| | | | 348/158 |
| 2016/0192009 A1 | 6/2016 | Sugio et al. | |
| 2017/0236331 A1 | 8/2017 | Bryson et al. | |
| 2017/0248438 A1 | 8/2017 | Bass et al. | |
| 2018/0160070 A1* | 6/2018 | Thompson | G06F 1/163 |
| 2018/0226063 A1* | 8/2018 | Wood | G10H 1/368 |

* cited by examiner

SYSTEM, APPARATUS, AND RELATED METHOD FOR GENERATING A GEOSPATIAL INTERACTIVE COMPOSITE WEB-BASED IMAGE MAP

CROSS REFERENCE TO RELATED APPLICATION

This application claims the benefit under 35 U.S.C. § 119(e) of U.S. Provisional Patent Application Ser. No. 62/591,352, filed Nov. 28, 2017, the disclosure of which is hereby incorporated herein in its entirety by this reference.

TECHNICAL FIELD

This disclosure relates to web-based image maps generally and, more specifically, to systems, apparatuses, and methods for generating a geospatial interactive composite web-based image map.

BACKGROUND

Currently, many existing websites and apps display images corresponding to specific geographic locations on a map, but such maps may not be efficient and/or effective. For example, conventional web-based maps that display corresponding images at geographic locations often only show a small icon or other tag indicating that one or more images exist that correspond to that location on the map and/or that more information is available to be displayed. In order for the user to view the images or information, the user needs to either click on an icon or hover over icons one icon at a time, which may be tedious and not efficient for understanding the information associated with the tag or icon placed on the map—particularly as the user adjusts the map views. FIG. 1 is an example of a conventional map for traffic cameras generated that includes icons, the map forcing the user to click each camera individually to display each image. This example is not very user friendly for quickly displaying images that represent a geographical area. Other conventional web-based maps may have a panel of the user interface adjacent to the map region that displays images or other information associated with items within the map view—again, often in response to the user selecting an item located on the map.

DETAILED DESCRIPTION

Figure 1:
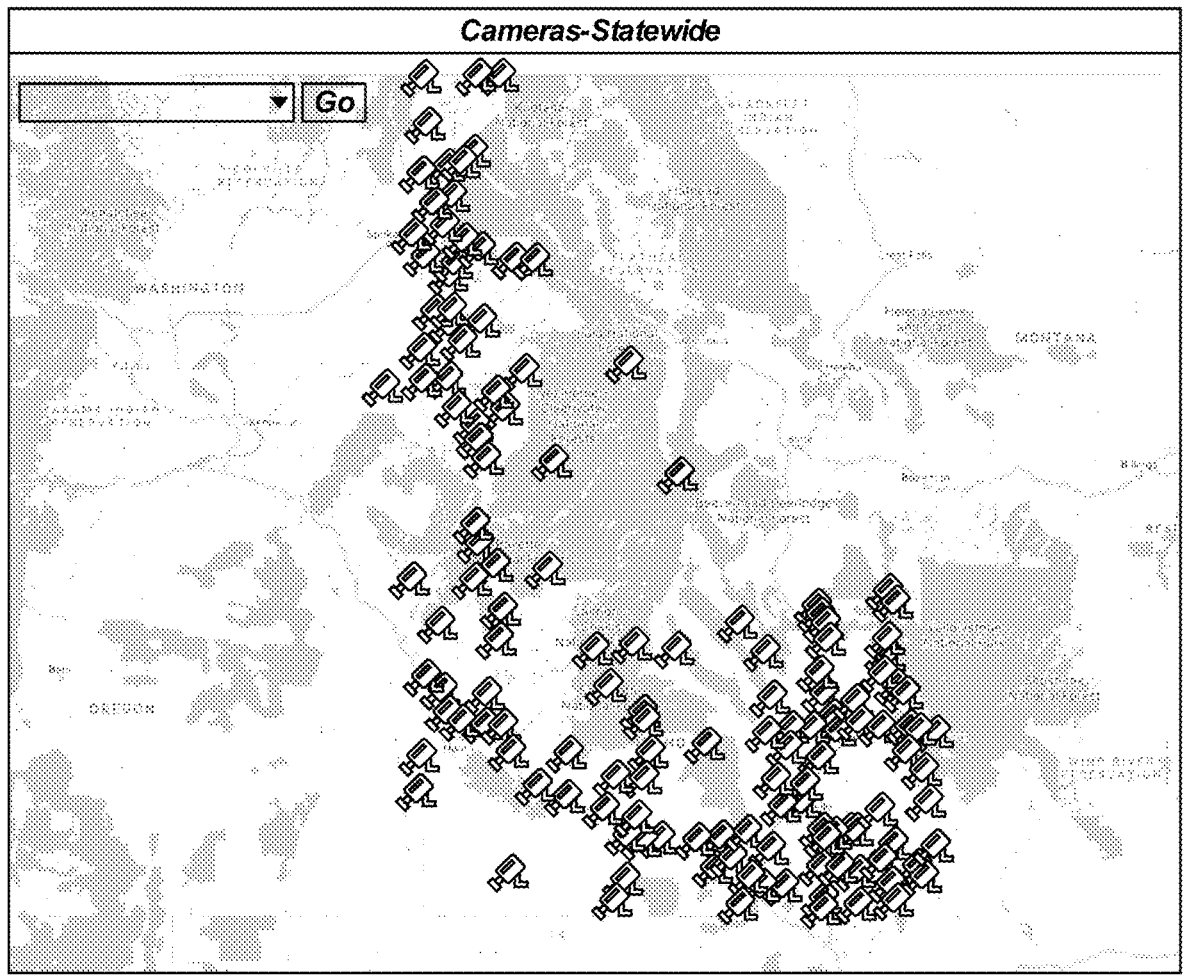
FIG. 1 is an example of a conventional map generated that includes camera icons that forces the user to click each camera icon individually to display each traffic image.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

A processor herein may be any processor, controller, microcontroller, system on a chip, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure.

The disclosure also provides meaningful limitations in one or more particular technical environments that go beyond an abstract idea. For example, embodiments of the disclosure provide improvements in the technical field of web-based mapping, particularly in generating a geospatial interactive composite web-based image map displaying a collage of images. In particular, embodiments of the present disclosure may solve problems of conventional methods by creating the composite image (i.e., collage) that displays multiple relevant images at once and overlaid onto a map. Such a collage may also be referred to herein as "a geospatial composite image map" or the like. The method may provide a web-based interface for a user to interactively interact with the image map to change the view and/or hierarchical view of the image map, thereby dynamically updating the collage by retrieving additional relevant images for the selected geographic location displayed by the map data. As a result, a better user experience may be achieved to provide faster access and an improved visualization of various types of data by simultaneously viewing image data (e.g., still images, streaming video, etc.) as a composite image overlaid on the map data in comparison with conventional methods.

In addition, it is noted that the embodiments are described in terms of a process that is depicted as a flowchart, a flow diagram, a structure diagram, or a block diagram. Although a flowchart or signal diagram show operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that may be executed by a processor to perform the described functions, or that facilitates transfer of a computer program or data from one place to another.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

Embodiments of the present disclosure include a system for generating a geospatial interactive composite web-based image map. The system comprises at least one processor and at least one non-transitory computer-readable storage medium storing instructions. The instructions, when executed by the at least one processor, may cause the system to receive, from a user device, a request for creating a geospatial interactive composite web-based image map for a selected region of map data displayed by the user device, select images responsive to the request corresponding to defined sub-regions within the selected region of the map data displayed by the user device, construct a collage for the geospatial composite web-based image map responsive to selecting the images, and transmit the collage to a user device for display thereon as an overlay to the map data.

Figure 2:
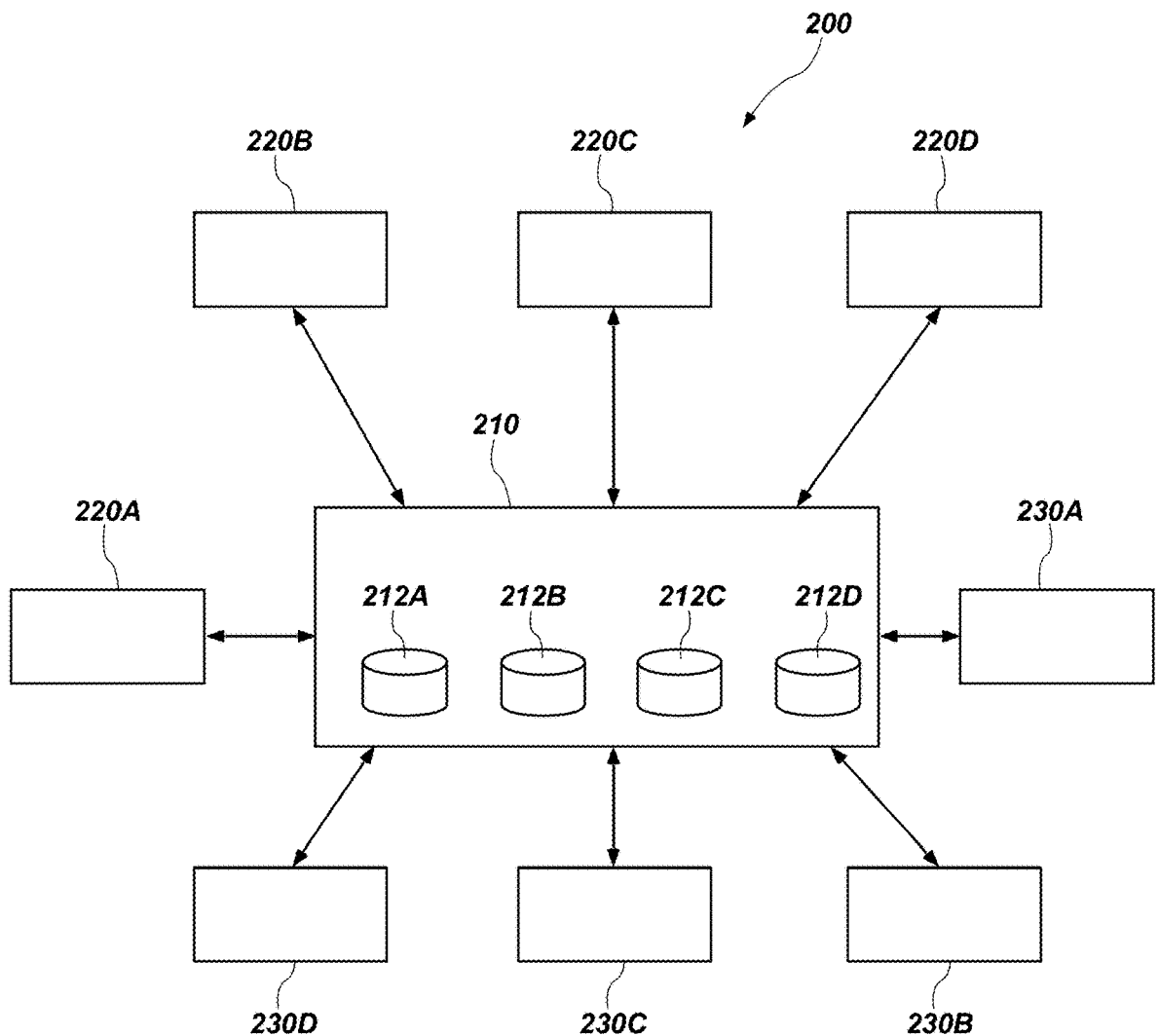
FIG. 2 is a block diagram of a web-based composite image map generation system according to an embodiment of the disclosure.

FIG. 2 is a block diagram of a web-based composite image map system 200 (also referred to as "system 200") according to an embodiment of the disclosure. The system 200 may include one or more management server(s) 210 configured to execute a collage generation tool that is configured to manage (e.g., create, modify, etc.) databases 212A-212D including data objects and create collages responsive to user interactions with the system 200 via user devices 220A-220D coupled to the management server 210. For simplicity, the management server 210 may be referred to in the singular at times; however, it should be understood that one or more servers may be used to perform the operations executed by the management server 210. Thus, the management server 210 may include one or more types of servers, one or more data stores, one or more interfaces, including but not limited to APIs, one or more web services, one or more content sources, one or more networks, or any other suitable components to enable communication with other devices or to a network. In this sense, the system 200 may provide a platform (e.g., backbone), with which other systems or devices may communicate to manage the databases 212A-212D, access the databases 212A-212D, and generate the collages described herein.

The system 200 may also be coupled to one or more content generators 230A-230D configured to provide image content (e.g., static images, streaming video, etc.) to the management server 210 for adding to the databases 212A-212D. For example, content generators 230A-230D may include internet-enabled cameras (e.g., webcams, traffic cameras, security cameras, dash cameras, body cameras, computers, smartphones, etc.) that are configured to capture and/or transmit to the management server 210 with the image content. Content generators 230A-230D may be third party entities (e.g., governmental agencies, private businesses, private individuals, etc.) that are different than and not controlled by, the administrator of the system 200. In other words, the system 200 may receive image content (e.g., free content, licensed content, etc.) from third party entities. In some embodiments, the administrator of the system 200 may generate its own content, such as building its own infrastructure and network of content generators 230A-230D. In some embodiments, the user devices 220A-220D may function as content generators configured to enable the users to provide image content to the system 200. Source images may be screened by the system administrator for content and accuracy prior to adding new source images to the large collection of images that may be used. For privacy reasons, people could be removed or blocked from the images, as well as license plate numbers and other personal information.

The management server 210 may be configured to communicate with the user devices 220A-220D and/or content generators 230A-230D over a network including the internet, an intranet, wired networks, wireless networks, fiber optic networks, cellular networks, satellite networks, or any other network component configured to facilitating communication between computing platforms, or any combination thereof. Communication between platforms may include control information (e.g., requests, commands, etc.) as well as an exchange of data. Of course, additional components of the network may not be shown for convenience, but it should be understood that additional intermediate components may be included that buffer, store, and/or route communication between devices.

The user devices 220A-220D may include any computing device configured to communicate with the management server 210 to send requests to generate a collage and receive the information in response thereto. In addition, the user devices 220A-220D may be configured to receive and display the collage on an electronic display to provide valuable information that is arranged as a collage on a map that may improve visual display of the information for an improved user experience, such as enhanced understanding and a more efficient way to present the information to the user. The user devices 220A-220D may, therefore, include a desktop computer, a laptop computer, a notebook computer, a tablet computer, a network server, a portable computing device, a personal digital assistant, a smartphone, a mobile telephone, cellular telephone (i.e., cell phone), a navigation system, a wearable device, a watch, a terminal, a distributed computing network device, a mobile media device, or any other device configured to operate as described herein in conjunction with a web browser, client application, operating system, and the like, using any programming language or communication protocol to directly or indirectly interface with the management server 210. The user devices 220A-220D may include components, such as a processor, input/output devices, memory, an electronic display, a battery, a speaker, and an antenna. The input/output devices may include a touch screen.

The databases 212A-212D may be configured to store and organize the information for each entry as one or more data objects used to generate web-based collages as described herein. Each database 212A-212D may be configured according to the category (e.g., type) of image data available to the user. For example, a first database 212A may be a restaurant database having data objects with information about various restaurants stored therein such as the name of the restaurant, geolocation data (e.g., address, GPS data, etc.), an image representative of the restaurant (e.g., a logo image, a photo image of a building, etc.), contact information, etc. In some embodiments, the image data or streaming data itself may include a geo-tag embedded therein that correlates the image data (e.g., still image or video images) to a specific geolocation. Such information may be used by the system 200 to build a collage for restaurants if such is desired by the user. A second database 212B may be a hotel database having information about various hotels stored therein. Such information may be used by the system 200 to build a collage for hotels if such is desired by the user. A third database 212C may be an auto mechanics database having information about various mechanics stored therein. Such information may be used by the system 200 to build a collage for mechanics if such is desired by the user. A fourth database 212D may be a dentist's database having information about various dentists stored therein. In some embodiments, the databases 212A-212D may include links to files stored by the system 200 and/or to externally stored images, information, and/or to live feeds. Such information may be used by the system 200 to build a collage for dentists if such is desired by the user.

In addition to data about the business itself, the databases 212A-212D may include additional data that may be used for one or more priority filters (e.g., based on image selection criteria such as a popularity ranking, a customer review ranking, an affordability ranking, etc.) that may be used to determine which images to use when building the collage as will be discussed below. In some embodiments, the user may desire to apply more than one priority filter. As a result, the selected images to build the collage may be based on a combined score for multiple rankings. The combined score may be evenly weighted across all criteria or have some form of weighting if some criteria is more important.

Of course, the database examples above are non-limiting and additional databases may be included. In addition, it is contemplated that the information may be organized and/or combined differently within the various databases. In some embodiments, one or more servers may be dedicated to storing images while other servers may be dedicated to informational data, such as geo-locational data, popularity data, rating data, etc. In addition, additional servers may be used to manage user accounts and maintain data (e.g., email address, login information, physical address, age, gender, and/or other personally identifiable information) for each user of the system 200.

The examples provided above with respect to the types of collages of images are described in terms of types of businesses (e.g., hotels, restaurants, mechanics, dentists, etc.). Embodiments of the disclosure include other types of information that can be categorized and mapped to geographic regions. For example, images for destinations such as landmarks, attractions, national parks, and so forth may be categorized and collages may be generated similarly as those discussed above.

Figure 3:
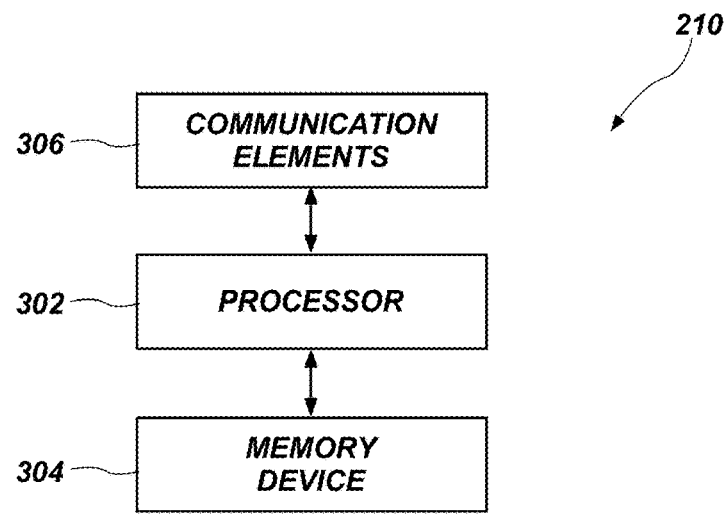
FIG. 3 is a simplified block diagram of the management server of FIG. 2.

FIG. 3 is a simplified block diagram of the management server 210 of FIG. 2. The management server 210 may include a processor 302 operably coupled with a memory device 304 and communication elements 306. The processor 302 may be configured to coordinate the communication between the various devices as well as execute instructions stored in computer-readable media of the memory device 304. The memory device 304 may include volatile and non-volatile memory storage for the management server 210. The memory device 304 may also have the databases 212A-212D stored therein. The communication elements 306 may include devices such as receivers, transmitters, transceivers, etc., that are configured to communicate with external devices (e.g., administrator computers, user devices, etc.). In some embodiments, the management server 210 may include other devices (e.g., input devices, output devices, etc.) if needed to facilitate its processes. The management server 210 may also execute (via processor 302) the collage generation tool that retrieves information from the databases 212A-212D and automatically generates collages responsive to user requests as will be discussed further below. The management server 210 may also execute (via processor 302) to collage generation tool to apply one or more priority filters for selecting the images for generating the collages.

Embodiments of the disclosure also include a non-transitory computer readable medium of a user device storing instructions thereon that, when executed by at least one processor, cause the at least one processor to perform steps comprising: displaying, on an electronic display of a user device, a geospatial interactive composite web-based image map, receiving, from a user input, a request to construct a collage for a selected region of map data of the geospatial interactive composite web-based image map, transmitting the request to a management server for generating the collage including selecting images for defined sub-regions within the selected region of map data, receiving the collage from the management server, and displaying the collage as overlay to the map data on the electronic display of the user device. The user device may include one or more processors coupled to communication elements and a memory device including the non-transitory computer readable medium.

Figure 4:
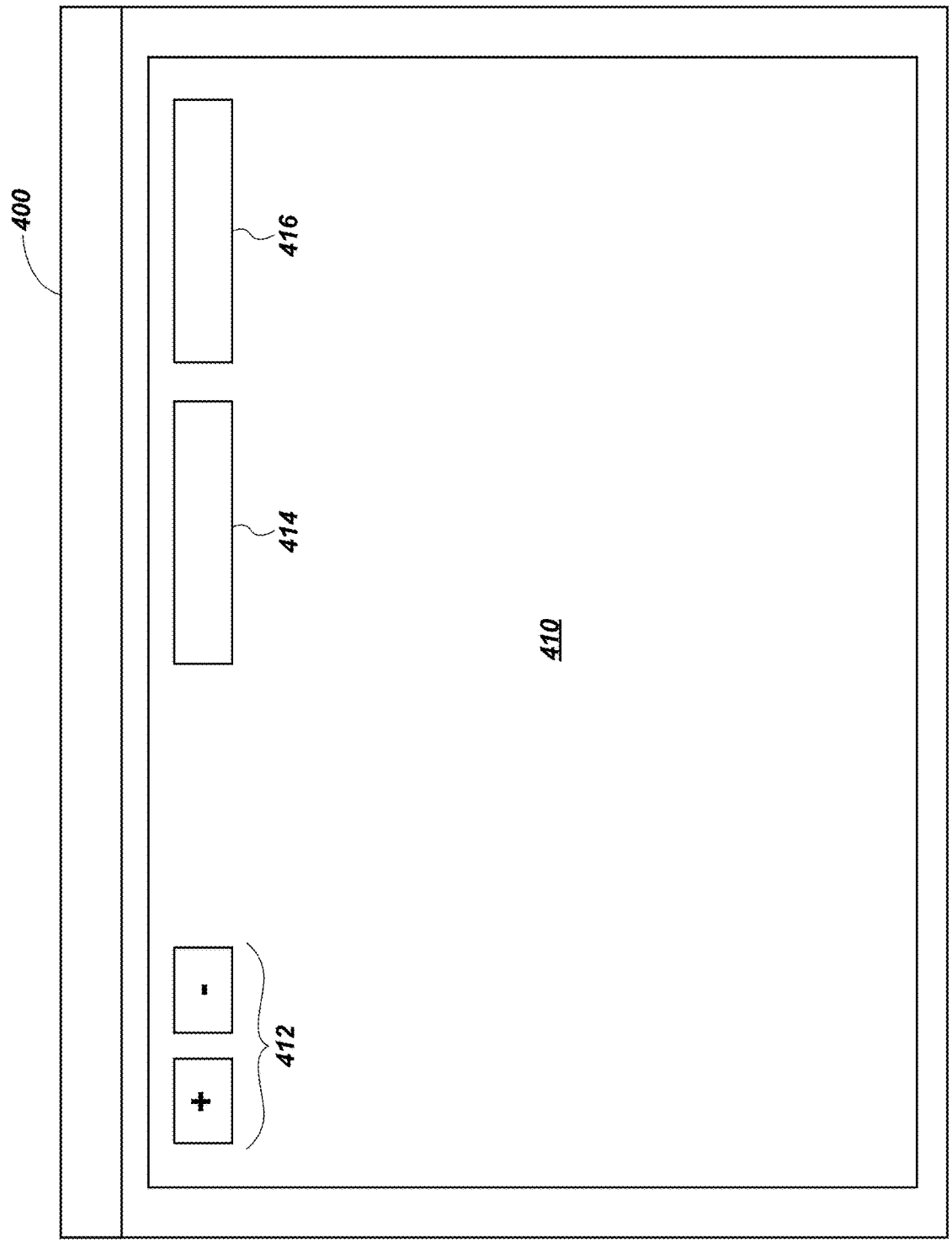
FIG. 4 is a screen shot of a graphical user interface that a user may operate on its user device to interact with the system of FIG. 2.

FIG. 4 is a screen shot of a graphical user interface 400 that a user may operate on its user device to interact with the system 200 of FIG. 2. The graphical user interface 400 may be include a web browser (e.g., GOOGLE CHROME®, INTERNET EXPLORER®, FIREFOX®, etc.) configured to access the system 200 through a URL or as a dedicated application stored on the user device, such as a mobile application.

The graphical user interface 400 may include a map region 410 configured to display the map data as well as the collage generated by the system 200 to be displayed and updated with the map data. The graphical user interface 400 may also include user input elements such as zoom elements 412 configured to cause the map data to zoom in and out and automatically generate an updated collage responsive to the user inputs. Zooming in and out and/or readjusting the current view of the map data may also be performed through various methods, such as keyboard commands, scrolling and/or clicking with a mouse, various touch commands on a touch screen interface, voice commands, among other interactions by the user.

Additional input elements may include input fields 414, 416 configured to apply different priority filters when generating the collage. For example, one filter input field may determine the type of collage to be generated as desired by the user. The user may select from a list of possible collages that are supported by the system 200. For example, the first topic input field 414 may include a drop down menu or other feature (e.g., scroll bar) so that the user may select the type of collage desired (e.g., restaurants, hotels, mechanics, dentists, etc.). In another embodiment, the first topic input field 414 may include a search field that the user may type in the desired subject if such is supported by the system 200. Some embodiments may include a management server that is configured to support a variety of different types of collages through a single user interface. Other embodiments may include a management server that is dedicated to a single type of collage. As a result, the graphical user interface 400 may not have need for the first topic input field 414 for selecting the type or subject matter for the collage.

A second input field 416 may be used to apply the priority filter when choosing which images to use when building the collage for different regions in which multiple images may be available but not all will be used. The second input field 416 may also be configured as a drop down menu, scroll bar, search field, or other similar element. Of course the regions and elements shown in FIG. 4 are non-limiting, and other regions are also contemplated to be displayed and offered to the user.

In response to the user inputs, a user device may send a request to the management server 210 to generate a desired collage with the map data displayed in the map region 410 of the graphical user interface 400. The management server 210 receives the request that includes the collage type and any priority filters selected. In addition, the management server 210 may receive map data indicating the map area displayed in the map region 410 to determine which images to use and how to configure the images (e.g., arrange, size, shape, etc.) to fit the map data. The collage may be generated and transmitted from the management server 210 to the user device for display thereon and interaction with a user. Changes to the map view, collage type, and/or priority filters may generate a new request to the management server 210 to update the collage according to the changes made. In some embodiments, the map data and its associated functionality (e.g., zoom in/out) may be provided through an application programming interface (API) to a server for an online map provider such as GOOGLE® Maps, MICROSOFT® BING® Maps, among other map platforms. The collage may be generated as an overlay to the map data. In some embodiments, some existing map features (e.g., roads, rivers, boundary lines, and other map elements) may be obscured by the collage overlaid on the map data. In other embodiments, the map features may be displayed such as, for example, the image data at least being partially transparent to certain map features as desired by the user.

FIGS. 5-9 are screen shots of collages 500-900 including map data with locations for images that may be displayed by the graphical user interface. For simplicity, specific images are not shown in the collages 500-900. Rather, numerals are shown in the collages 500-900 showing locations for images as would be selected based on the subject matter for the collage as well as priority filters applied by the management server. In addition, the map data shown is simplified to show certain features such as boundaries. Other maps features such as location names, physical features (e.g., mountains, rivers, etc.), roads, etc., may be included as desired depending on the embodiment and/or hierarchical level.

Figure 5:
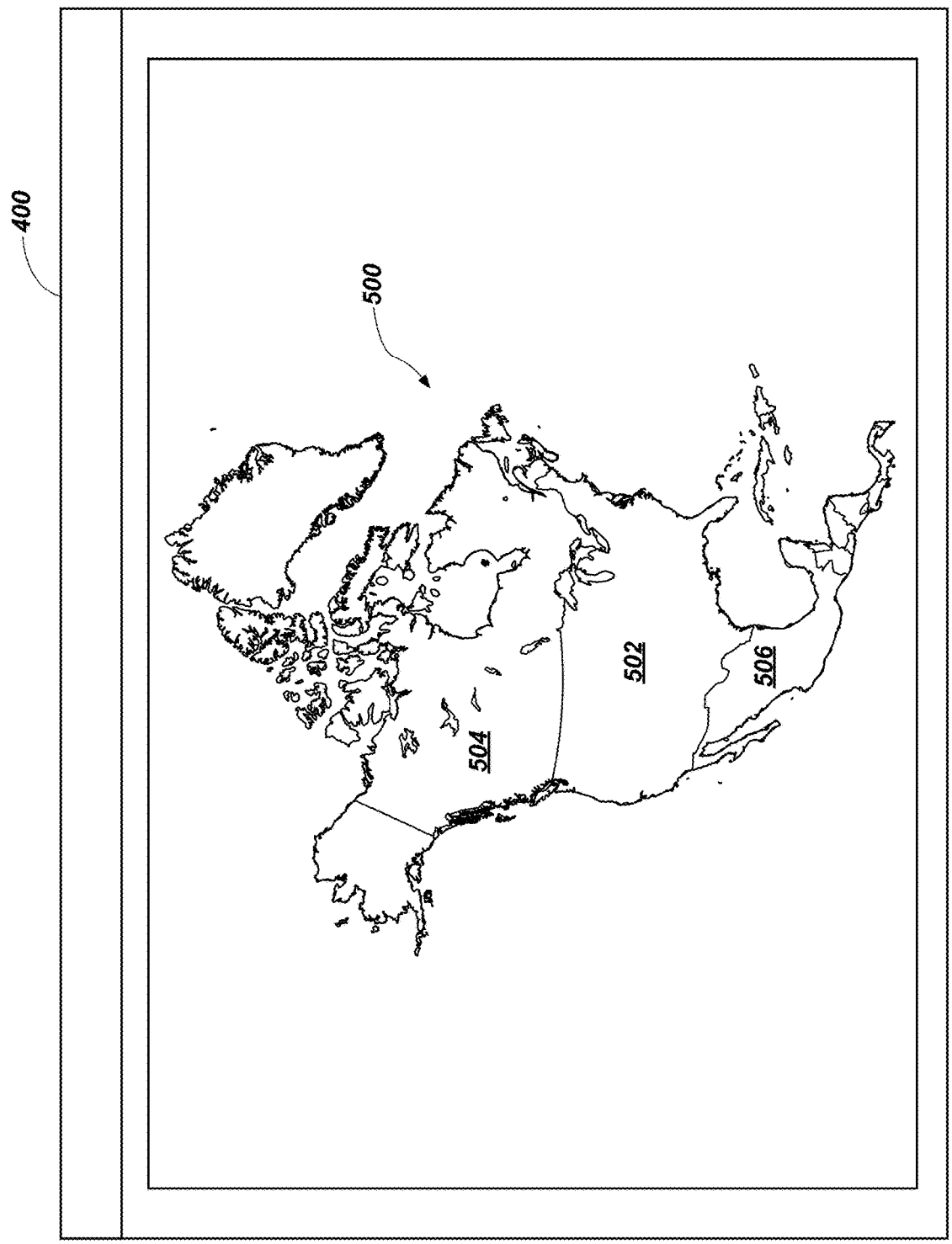
FIGS. 5-9 are screen shots of collages including map data with locations for images that may by the graphical user interface.

The map data may be received by the user devices, processed, and displayed in the graphical user interface. For simplicity, the map data of FIG. 5 is a high level view showing North America and Central America. Country boundaries may be displayed. At this level, the collage 500 may be generated by the management server by analyzing the geolocation data and other priority filter data associated with the images to select the images to be overlaid and fill out the map data being displayed. For example, if the user selects "restaurants" as the image type, and "most popular" as the priority filter, the processor may query the databases and image data to determine the most popular restaurants across the defined sub-regions shown by the current view of the map data. As shown in FIG. 5, the countries of North America and Central America are shown. The image data associated with the most popular restaurant for each country (if available) may be overlaid within the region of each country shown on the map. For example, a first image 502 associated with the most popular restaurant of the United States may be displayed within the United States region shown, a second image 504 associated with the most popular restaurant of Canada may be displayed within the Canada region shown, a third image 506 associated with the most popular restaurant of Mexico may be displayed within the Mexico region shown, and so on for the other countries displayed. Other images for other countries shown are not labeled for convenience and simplicity of description. If no images are available for a particular sub-region (e.g., country) the sub-region may simply be left blank or some other indication may be displayed that no image is available.

The selected images may all be seamlessly displayed at once to primarily fill the entire map shown. Each image fills the appropriate place on the map where it geospatially originates from with regard to the hierarchical level shown in the current view of the map data. In some embodiments, the original images may be pre-processed when generating the collage to primarily fit the geospatial area being represented. For example, the dimensions of the first image 502 associated with the most popular restaurant in the United States may be adjusted to fit the boundaries of the United States so that the image (e.g., logo, meme with text, photograph, etc.) fills out the majority of the internal area of the United States. For some embodiments in which the area for the image has a shape that is not particularly suitable for image adjustment during the pre-processing stage, the image may be sized for that area and the remaining space of the area around the image may be filled with a background that distinguishes (e.g., by color or design) from backgrounds from adjacent areas with the other images of the collage 500.

Figure 6:
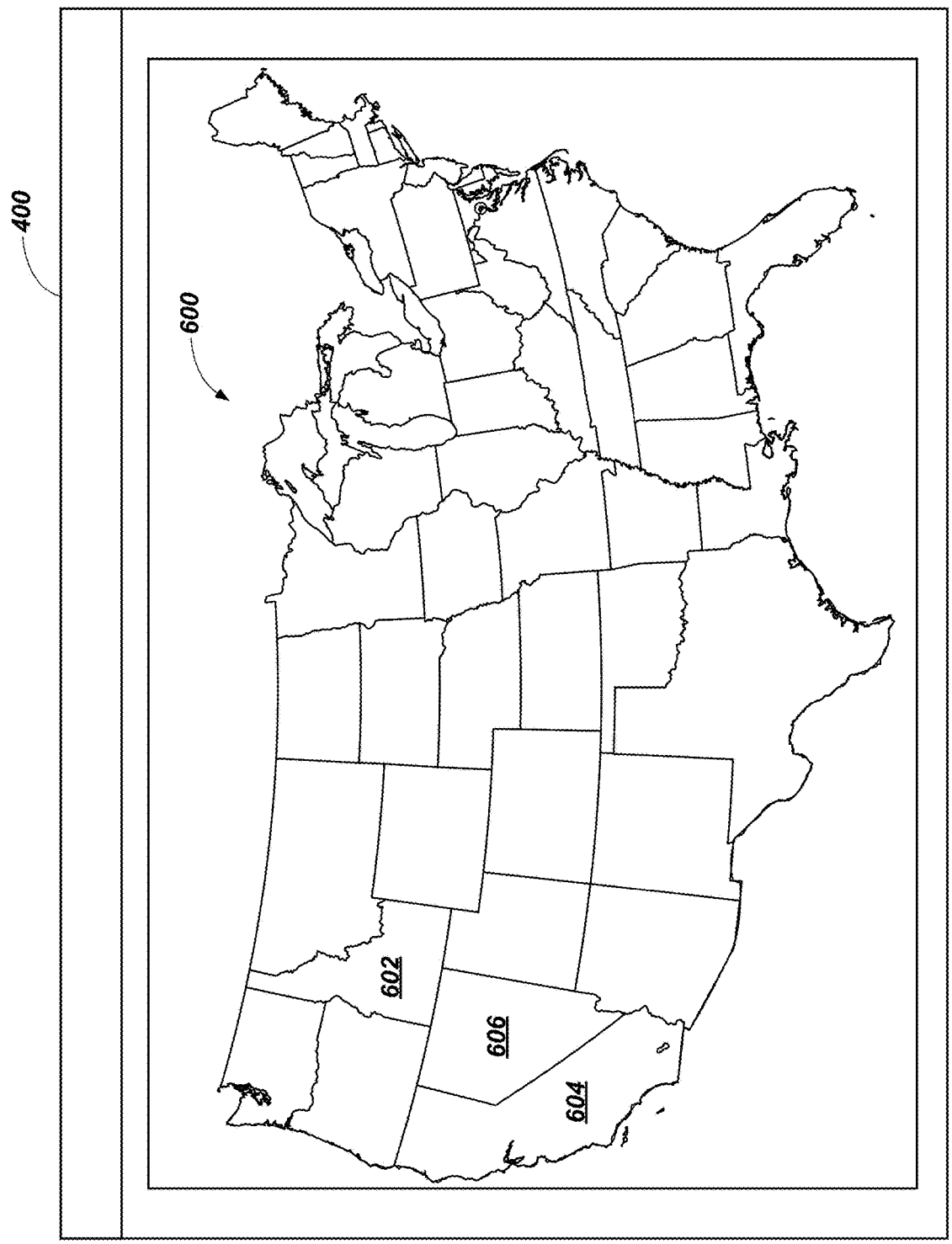

As the user interacts with the graphical user interface to zoom in to a selected region of the map, the collage will be continuously re-populated with more images from that region, if available. Again, the management server may determine the regions being shown and the hierarchical level of the map data to select images for the defined regions. For example, the user may zoom in to focus just on the United States as shown in FIG. 6. As a result, state boundaries in the map data of collage 600 may be used as in FIG. 6 to define the regions for the collage 600 as opposed to country boundaries as in FIG. 5. Again, the images may be selected for each region based on the type of image and the priority filters selected. For example, a first image 602 associated with the most popular restaurant of Idaho may be displayed within the Idaho region shown, a second image 604 associated with the most popular restaurant of California may be displayed within the California region shown, a third image 606 associated with the most popular restaurant of Nevada may be displayed within the Nevada region shown, and so on for the other states displayed. Other images for other states shown are not labeled for convenience and simplicity of description. The images (e.g., 602, 604, 606) for each state in FIG. 6 could each be instances of the same image as the image used for the first image 502 used for the United States in FIG. 5, but depending on the application of the priority filters for these new regions one or more of the images may be different than the image used for the first image 502 used for the United States in FIG. 5. For example, the most popular restaurant across the entire United States may be McDonalds, but the most popular restaurant within California may be In-N-Out Burger. As the user continues to drill down and zoom in, a specific restaurant within a specific community may be the most popular.

Figure 7:
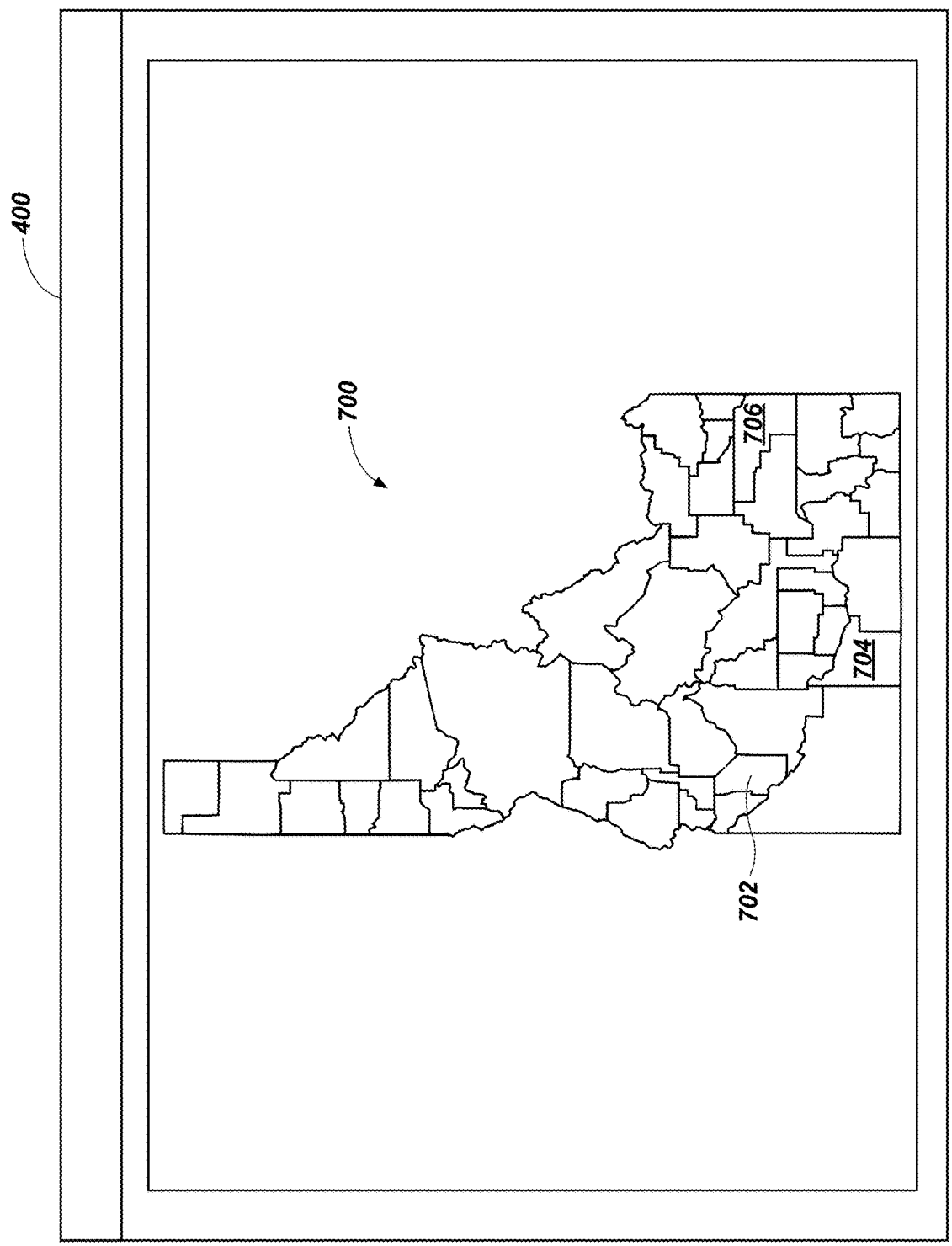

The user may further zoom in to a state, such as Idaho, as shown in FIG. 7 such that only images from Idaho in the region that is being zoomed into will be displayed. As a result, county boundaries in the map data may be used as in FIG. 7 to define the regions for the collage 700 as opposed to state boundaries as in FIG. 6. Again, the images may be selected for each region based on the type of image and the priority filters selected. For example, a first image 702 associated with the most popular restaurant of Ada County may be displayed within the Ada County region shown, a second image 704 associated with the most popular restaurant of Twin Falls County may be displayed within the Twin Falls County region shown, and a third image 706 associated with the most popular restaurant of Bonneville County may be displayed within the Bonneville County region shown, and so on for the other counties displayed. Other images for other counties shown are not labeled for convenience and simplicity of description.

Figure 8:
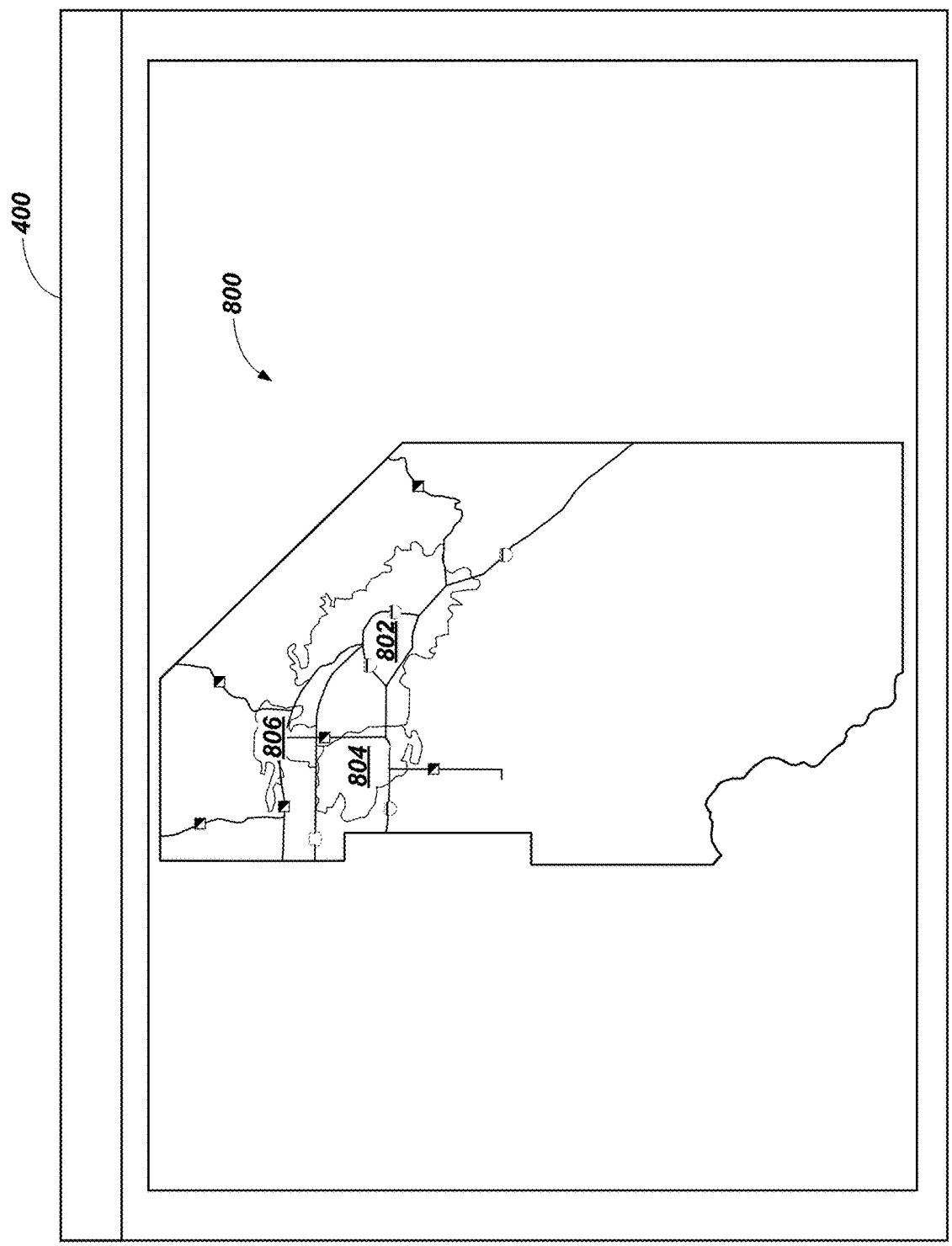

The user may further zoom in to a county, such as Ada County, as shown in FIG. 8 such that only images from Ada County in the region that is being zoomed into will be displayed. As a result, city boundaries in the map data may be used as in FIG. 8 to define the regions for the collage 800 as opposed to county boundaries as in FIG. 7. Again, the images may be selected for each region based on the type of image and the priority filters selected. For example, a first image 802 associated with the most popular restaurant of Boise may be displayed within the Boise city region shown, a second image 804 associated with the most popular restaurant of Meridian may be displayed within the Meridian city region shown, a third image 806 associated with the most popular restaurant of Eagle may be displayed within the Eagle city region shown, and so on for the other cities displayed. Other images for other counties shown are not labeled for convenience and simplicity of description.

Figure 9:
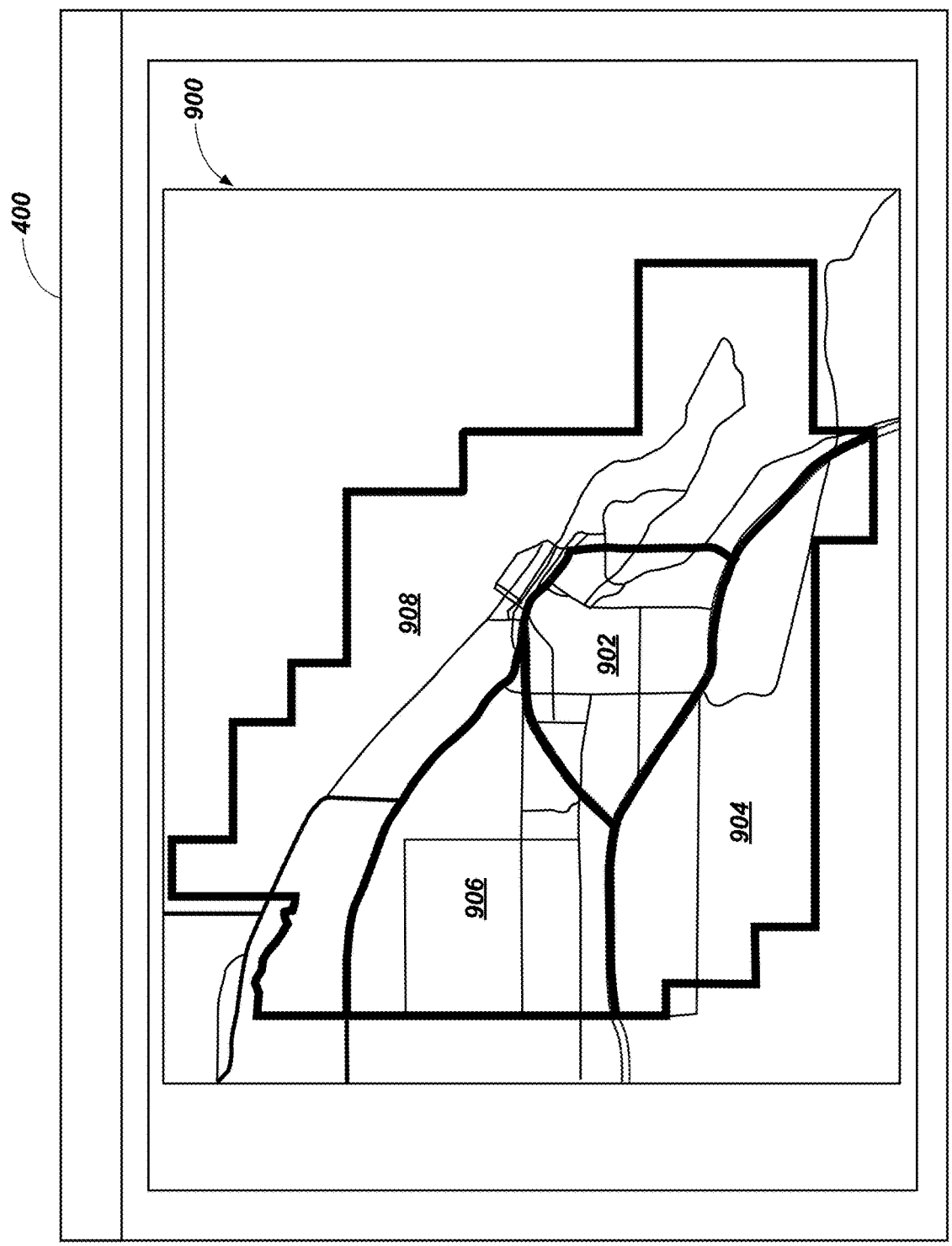

The user may further zoom in to a city, such as Boise, as shown in FIG. 9 such that only images from Boise in the region that is being zoomed into will be displayed. As a result, sub-regions in the map data may be used as in FIG. 9 to define the regions for the collage 900 as opposed to city boundaries as in FIG. 8. The sub regions may be pre-defined based on factors such as size, roads, neighborhoods, commercial districts, or some other designation. Again, the images may be selected for each region based on the type of image and the priority filters selected. For example, a first image 902 associated with the most popular restaurant of the first sub-region may be displayed within the Boise city sub-region shown, a second image 904 associated with the most popular restaurant of the second sub-region may be displayed within the Boise city sub-region shown, a third image 906 associated with the most popular restaurant of the third sub-region may be displayed within the Boise city sub-region shown, a fourth image 908 associated with the most popular restaurant of the fourth sub-region may be displayed within the Boise city sub-region shown, and so on for any other sub-regions displayed. Other images for other counties shown are not labeled for convenience and simplicity of description.

As discussed above, processing adjustments may be made for different hierarchical levels to generate collages based on country boundaries, state boundaries, county boundaries, city boundaries, or other defined sub-region boundaries. Additional regions may be defined at extremely high resolutions, such as within a neighborhood or even within a building. For example, the user may zoom into a shopping mall to generate a collage for the most popular restaurants within different areas within the shopping mall.

It should be recognized that the examples given demonstrate views that are focused clearly on a specific region within its hierarchical level. For example, FIG. 7 shows only Idaho isolated from its neighboring states. It is contemplated that map views may contain partial views of countries, states, counties, cities, etc. Thus, a map view of Idaho as in FIG. 7 may also provide counties from neighboring states (e.g., Utah, Montana, Wyoming, Nevada, Oregon, and Washington). As a result, the generated collage may include images for counties from different states depending on the particular view of the map data within the graphical user interface. This can further extend to collages that include cities from neighboring states, sub-regions of neighboring cities, and so on.

In addition, while political boundaries such as countries, states, counties, cities, etc., may be used to define boundaries that are used to select images and generate the collages, other boundaries may also be implemented such as boundaries for area codes, zip codes, and so on. Non-political boundaries may be defined, such as based on physical features (e.g., rivers, valleys, mountain ranges, etc.), population densities, or other criteria. Other boundary user-defined boundary definitions are also contemplated that may be drawn on the fly. For example, the graphical user interface may enable the user to draw his or her own boundaries to create a custom collage for a particular view. Once the boundaries are defined and saved by the user, the collage may be generated based on the images that have geolocation data that fall within the defined boundaries.

Embodiments of the disclosure may also include hyperlink data associated with the images that may provide additional functionality for the user to click on an image to obtain additional information, place a call, redirect to a website, make a purchase, open a new window, among other actions. Interacting with the image may impact various rankings associated with the images, such as popularity, ratings, etc., such that when users interact with the system 200 by providing clicks, reviews, purchases, the databases may be modified to reflect newer rankings. As a result, subsequent collages may be different if the rankings for a priority filter change.

As described above, embodiments of the disclosure include other types of information that can be categorized and mapped to geographic regions other than business-type applications. For example, images for destinations such as landmarks, attractions, national parks, and so forth may be categorized and collages may be generated similarly as those discussed above. A user may desire to build a collage for the most popular national parks or monuments over a desired region (e.g., the Western United States) and be able to zoom in and out between a low resolution collage (e.g., showing multiple states) and higher resolution collage where the images are more closely aligned to the specific location on the map.

Embodiments of the disclosure may include informational collages that can be categorized and mapped according to geographic regions. For example, images for various forms of information may be categorized and collages may be generated similarly as those discussed above. As a specific example, the user may desire to build a collage for the most popular baby names over a desired region (e.g., the United States) and be able to zoom in and out of the map to automatically update the map and generate a new higher resolution collage where the images are more closely aligned to a specific location on the map. Thus, the user may be able to quickly access and identify what the most popular baby name is for the United States, individual states, counties, cities, and all the way down to a very high resolution collage at a neighborhood level if such detailed information is available to the system 200. Similar collages may be generated for things like average household incomes across low resolution collages and high resolution collages if such information is available at a hyper local level. By being able to quickly zoom in and out of a map, the user may be able to quickly learn and compare such information across different regions. The images shown for such informational collages may be as simple as a color background with the textual information being conveyed for that region of the collage.

Embodiments of the disclosure may also include collages that include video data. For example, streaming video from multiple locations may be provided to the appropriate region for the collage. For example, security cameras, body cameras, police cameras, weather cameras, traffic cameras, etc., may transmit live video to the system 200 at a particular location. Depending on the type of device, the location may be stationary or mobile at which point the geo-locational data may be constantly changing for a mobile camera. The video data may be filtered based on the source of the video data, such as mobile news crews, celebrity live video broadcasts, non-celebrity video broadcasts, government official video broadcasts, and so forth. Video broadcasts may be recorded from within buildings, and the geolocation data accompanying the video may provide a high enough possible geographic resolution to create a collage associated with a map to view simultaneous video streams within a single building (e.g., public buildings, private residences, etc.) if such are available.

Additional embodiments may also include collages that promote experiences. For example, a collage may be generated for a region with image data showing what video content people within that region are watching at a given point in time. The collage may be filtered based on type of show being watched (e.g., movie, sporting event, TV series, etc.) at a given moment for people within that region. Creating such a collage may influence the users viewing decisions, and the user may select the image (e.g., video stream) on the collage to open a larger window or enter full screen mode to view the show. In some embodiments, a priority filter may be applied for a popular show and/or highest rated show over a window of time (e.g., week) to generate the collage for the region rather than in real-time. Changing views by moving the map data and/or zooming in and out may automatically adjust the map display and dynamically and automatically generate the new collage for the new map view. Such a collage may not be customer facing. For example, a video streaming service may desire to enable its employees to create such a collage to better visually understand the viewing habits of their customers.

Additional embodiments may also include collages based on purchase data. For example, a collage may use images from purchase data for a given region. For example, the images associated with the most popular child's toy for a given region may be used to generate a collage that is overlaid on map data for a user to interact with. Such purchase data may be received from one or more third party sellers (e.g., Amazon, Wal-Mart) to visualize purchase habits for different types of products. Generating such a collage may be also be a feature offered to customers directly by the seller itself using its own purchase data by integrating the collage generation tool into their website or apps. As a result, customers may visualize such information at different hierarchical levels, which may influence their purchases. Such a tool may be used by analysts to better visualize purchases for different regions to better allocate resources or inventory.

Embodiments of the present disclosure include a method of updating a geospatial interactive composite web-based image map. The method comprises receiving, from a user device, a request to construct a collage for a selected region of map data of a geospatial interactive composite web-based image map displayed by the user device, generating the collage including selecting images for defined sub-regions within the selected region of map data responsive to the request, and transmitting the collage to the user device for display thereon as an overlay to the map data.

Figure 10:
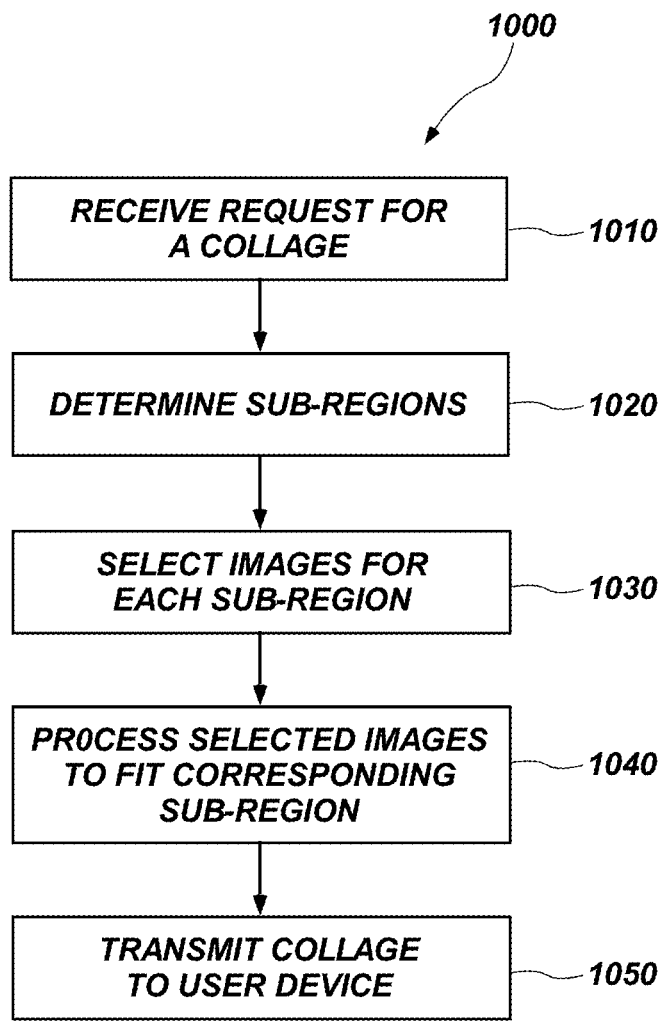
FIG. 10 is a flowchart illustrating a method for generating a geospatial interactive composite web-based image map according to an embodiment of the disclosure.

FIG. 10 is a flow chart 1000 illustrating a method for generating a geospatial interactive composite web-based image map. At operation 1010, the method includes a management server receiving a request from a user device responsive to a user input to a graphical user interface displayed by the user device (e.g., through a web browser, a client application, etc.). The graphical user interface displayed by the user device may display map data and other information and features to assist in facilitating the request. The request may include the type of images desired to form the collage, such as the category (i.e., subject matter) of images to be used when compiling the images to generate the collage. The request may also include map information about the current view of the map being displayed on the graphical user interface, such as the location and zoom level to determine the metes and bounds of the current map view. The request may also include filter data, such as any priority filters that are also to be applied to the collage, such as whether images should be selected based on popularity, a rating, or other specialty filters depending on the selected subject matter. In some embodiments, such information may be received via a single request. In some situations, different requests may include different information depending on specific interactions by the user. In some embodiments, the map information may be received by the system if that information is already available from other internal programs supporting the map functionality and/or from a third party provider that provides the support for the map functionality.

At operation 1020, the method includes the management server determining sub-regions within the map data for placement of images. As discussed above, the management server may retrieve the geolocation data along the outer boundary of the current map view being displayed to determine a hierarchical level, and from which the internal area may be divided to define the sub-regions that are used for image placement. The hierarchical level may be the highest hierarchical level that fits a threshold number of sub-regions within the current selected view of the map data.

At operation 1030, the method includes querying the databases to select images for each defined region for the current map view. Selection may be based on criteria such as the type of images and the corresponding geolocation data falling within the defined region, as well as one or more priority filters used to select between multiple images that may have geolocation data that falls within the defined region.

At operation 1040, the method includes processing the selected images that will be displayed in each sub-regions according to the shapes of the respective sub-region. In some embodiments, the shapes of the images themselves may be cropped or otherwise adjusted to correspond to the actual shape of the sub-region. In other words, the shapes of the processed images and the shapes of the corresponding sub-region are identical. In some embodiments, the image may be adjusted to primarily fit within the sub-region with the remaining area of the sub-region being filled with a contrasting background relative to adjacent sub-regions. The contrasting background may be built into the image file itself or applied by the user device when the images of the collage are displayed.

At operation 1050, the method includes transmitting the collage data to the user device. In some embodiments, the image data may be fully constructed by the management server as a single image prior to transmission such that the single image is overlaid on the map data. In other embodiments, the collage data may include the group of processed images and data and/or instructions for their corresponding sub-regions of the collage for the user device to overlay the image data on the map data when displayed by the user device.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A system for generating a geospatial interactive composite web-based image map, comprising:
    at least one processor; and
    at least one non-transitory computer-readable storage medium storing instructions thereon that, when executed by the at least one processor, cause the system to:
        receive, from a user device, a request for creating a geospatial interactive composite web-based image map for a selected region of map data displayed by the user device;
        select discrete images responsive to the request corresponding to defined sub-regions within the selected region of map data displayed by the user device;
        construct a collage for the geospatial interactive composite web-based image map responsive to selecting the discrete images, the collage including the selected discrete images to be displayed at the same time; and
        transmit the collage to the user device for display thereon as an overlay to the map data.

2. The system of claim 1, wherein the at least one processor is configured to continuously update the geospatial interactive composite web-based image map by re-populating with more images responsive to receiving additional requests from the user device when a user zooms in or out of the selected region of map data.

3. The system of claim 1, wherein the discrete images include still images.

4. The system of claim 1, wherein the discrete images include video images.

5. The system of claim 1, further comprising cameras coupled to the at least one processor and configured to transmit video feeds to the at least one processor.

6. The system of claim 5, wherein the cameras include one or more web cameras, security cameras, traffic cameras, body cameras, police cameras, or cameras integrated into user devices.

7. The system of claim 1, wherein the defined sub-regions are pre-defined sub-regions for a determined hierarchical level within the selected region of map data.

8. The system of claim 7, wherein the pre-defined sub-regions are based, at least in part, on political boundaries.

9. The system of claim 1, wherein the defined sub-regions are user-defined sub-regions for a determined hierarchical level within the selected region of map data.

10. A method of updating a geospatial interactive composite web-based image map, the method comprising:
    receiving at a server, from a user device, a request to construct a collage for a selected region of map data of a geospatial interactive composite web-based image map displayed by the user device;
    the server generating the collage including selecting discrete images for defined sub-regions within the selected region of map data responsive to the request, the collage including the selected discrete images to be displayed together; and
    transmitting the collage from the server to the user device for display thereon as an overlay to the map data.

11. The method of claim 10, wherein the request includes a type of collage and a selected priority filter to be used when generating the collage.

12. The method of claim 11, wherein the request further includes information indicating the selected region of map data.

13. The method of claim 11, wherein selecting the discrete images for the defined sub-regions includes querying a ranking from the selected priority filter for each image having geolocation data falling within a respective defined sub-region.

14. The method of claim 10, further comprising generating and transmitting an updated collage responsive to receiving an additional request to construct a collage for an updated selected region of map data.

15. The method of claim 10, wherein the request further includes information indicating user-defined sub-regions to be used as the defined sub-regions for generating the collage.

16. The method of claim 10, wherein generating the collage further includes processing the selected discrete images to alter the discrete images to have a shape that fits a shape of their corresponding defined sub-regions.

17. The method of claim 16, wherein the shape of the altered discrete images and the shape of their corresponding defined sub-regions are identical.

18. The method of claim 10, wherein generating the collage includes constructing the collage as a single image prior to transmitting the collage to the user device.

19. The method of claim 10, wherein transmitting the collage includes transmitting the selected discrete images individually with instructions for the user device to organize the discrete images as an overlay to the map data.

20. A non-transitory computer readable medium of a user device storing instructions thereon that, when executed by at least one processor, cause the at least one processor to perform steps comprising:
- displaying, on an electronic display of a user device, a geospatial interactive composite web-based image map;
- receiving, from a user input associated with the user device, a request to construct a collage for a selected region of map data of the geospatial interactive composite web-based image map;
- transmitting the request to a management server for generating the collage including selecting discrete images for defined sub-regions within the selected region of map data;
- receiving the collage from the management server, the collage including the selected discrete images to be displayed in combination; and
- displaying the collage as an overlay to the map data on the electronic display of the user device.

\* \* \* \* \*